(12) United States Patent
Choi (10) Patent No.: US 12,509,230 B2
(45) Date of Patent: Dec. 30, 2025

(54) MOVING COCKPIT FOR VEHICLE (71) Applicant: HYUNDAI MOBIS CO., LTD., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 43 days.

(21) Appl. No.: 18/511,395

(22) Filed: Nov. 16, 2023

(65) Prior Publication Data
US 2024/0239493 A1 Jul. 18, 2024

(30) Foreign Application Priority Data
Jan. 12, 2023 (KR) .......................... 10-2023-0004589

(51) Int. Cl.
*B64D 11/06* (2006.01)
(52) U.S. Cl.
CPC ...... *B64D 11/0639* (2014.12); *B64D 11/0619* (2014.12)

(58) Field of Classification Search
CPC ............ B64D 11/0639; B64D 11/0319; B60N 2/005; B60N 2/02; B60N 2/14; B60N 2/015; B60K 35/00; B60K 35/22; B60K 37/00

See application file for complete search history.

(56) References Cited

U.S. PATENT DOCUMENTS

| 2,822,187 A * | 2/1958 | Bibbs ..................... B60R 21/08 280/752 |
| 2003/0197392 A1* | 10/2003 | Clark ........................ B60R 7/04 296/24.34 |
| 2016/0152163 A1* | 6/2016 | Strasdat ................... B60N 2/24 296/64 |

* cited by examiner

*Primary Examiner* — Jason D Shanske
*Assistant Examiner* — Scott Lawrence Strickler
(74) *Attorney, Agent, or Firm* — NSIP Law (57) ABSTRACT

A moving cockpit for a vehicle including a cockpit module provided in an inner front side of the vehicle, a guide rail provided on an inner panel of the vehicle, the guide rail extending in a forward direction and a backward direction relative to the front side of the vehicle, and a cockpit moving unit movably provided on the guide rail, the cockpit configured to move the cockpit module forward and backward in the vehicle.

15 Claims, 9 Drawing Sheets

[DRIVE MODE]

FIG. 6

[FACE-TO-FACE MODE]

FIG. 7

[DRIVE MODE]

[FACE-TO-FACE MODE]

MOVING COCKPIT FOR VEHICLE

CROSS-REFERENCE TO RELATED APPLICATION

This application claims the benefit under 35 USC § 119(a) of Korean Patent Application No. 10-2023-0004589, filed on Jan. 12, 2023, the entire disclosure of which is incorporated herein by reference for all purposes.

BACKGROUND

1. Field of the Invention

The present disclosure relates to a moving cockpit for a vehicle, and more particularly, to a moving cockpit for a vehicle capable of moving according to a mode in the vehicle.

2. Discussion of Related Art

As the development of autonomous driving vehicles expands in recent years, the role of a driver is further reduced, and a method of using the interior space of a vehicle more efficiently is required beyond the concept of mere driving in the vehicle or relaxing in a seat.

A cockpit module provided in a vehicle is fixed to the front of a driver's seat and serves to provide information necessary for driving and fix manipulated components. However, at autonomous driving level 4 or higher, the cockpit module has a reduced role and seems to be insufficient to satisfy the needs of various passengers in the interior space compared to the previous case. Accordingly, with the development of autonomous driving vehicles, it is necessary to develop a technique for efficiently using the interior space of a vehicle by utilizing a cockpit module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a moving cockpit for a vehicle including a cockpit module provided in an inner front side of the vehicle, a guide rail provided on an inner panel of the vehicle, the guide rail extending in a forward direction and a backward direction relative to the front side of the vehicle, and a cockpit moving unit movably provided on the guide rail, the cockpit configured to move the cockpit module forward and backward in the vehicle.

The cockpit module may include a main plate and a crash pad unit configured to be detachable from one of an upper surface and a lower surface of the main plate.

The crash pad unit may include an upper crash pad configured to be detachable from the upper surface of the main plate and a lower crash pad configured to be detachable from the lower surface of the main plate.

The upper crash pad may include a first upper crash pad disposed in a front side of the upper crash pad and a second upper crash pad disposed in a back side of the upper crash pad in line with first upper crash pad, and the lower crash pad may include a first lower crash pad disposed in the front side of the upper crash pad and a second lower crash pad disposed in the back side of the upper crash pad in line with the first lower crash pad.

The cockpit module may include an auxiliary display rotatably connected to an upper surface of the upper crash pad.

The cockpit module may include a display provided in the upper crash pad and the upper crash pad may be rotatably connected to an end of the main plate.

The main plate may include a rail portion configured to receive the upper crash pad and to be rotatably movable.

The lower crash pad may include a receiving portion formed therein.

The guide rail may include upper guide rails installed on a first side and a second side of an inner upper panel of the vehicle and lower guide rails installed on a first side and a second side of an inner lower panel of the vehicle.

The cockpit module may include upper brackets configured to be movable along the upper guide rails and connected to both sides of the cockpit module and lower brackets configured to be movable along the lower guide rails and connected to both sides of the cockpit module.

The main plate may include support grooves defined in a first side surface and a second side surface of the main plate, and the lower brackets may be seated in the support grooves.

The lower brackets may be configured to support the first side surface and the second side surface of the main plate.

The cockpit module may include a wire configured to supply electrical power to the cockpit module, the wire extending along the lower bracket.

In a general aspect, here is provided a cockpit module for a vehicle including a first cockpit moving part configured to move on a first guide rail of the vehicle and a second cockpit moving part configured to move on a second guide rail of the vehicle, wherein the first cockpit moving part and the second cockpit moving part are configured to translate the cockpit module in a first direction and a second direction of the vehicle.

The cockpit module may include a main plate, an upper bracket moveably provided on the first guide rail, and a lower bracket moveably provided on the second guide rail, the upper bracket and the lower bracket being configured to support the main plate.

The cockpit module may include a first crash pad configured to be detachably connected to an upper surface of the main plate and a second crash pad configured to be detachably connected to a lower surface of the main plate.

The first crash pad may include a front seat portion and a rear seat portion and the front seat portion and the rear seat portion may be arranged in a driving mode and a face-to-face mode.

The second crash pad may include a front seat portion and a rear seat portion and the front seat portion and the rear seat portion may be arranged in a driving mode and a face-to-face mode.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
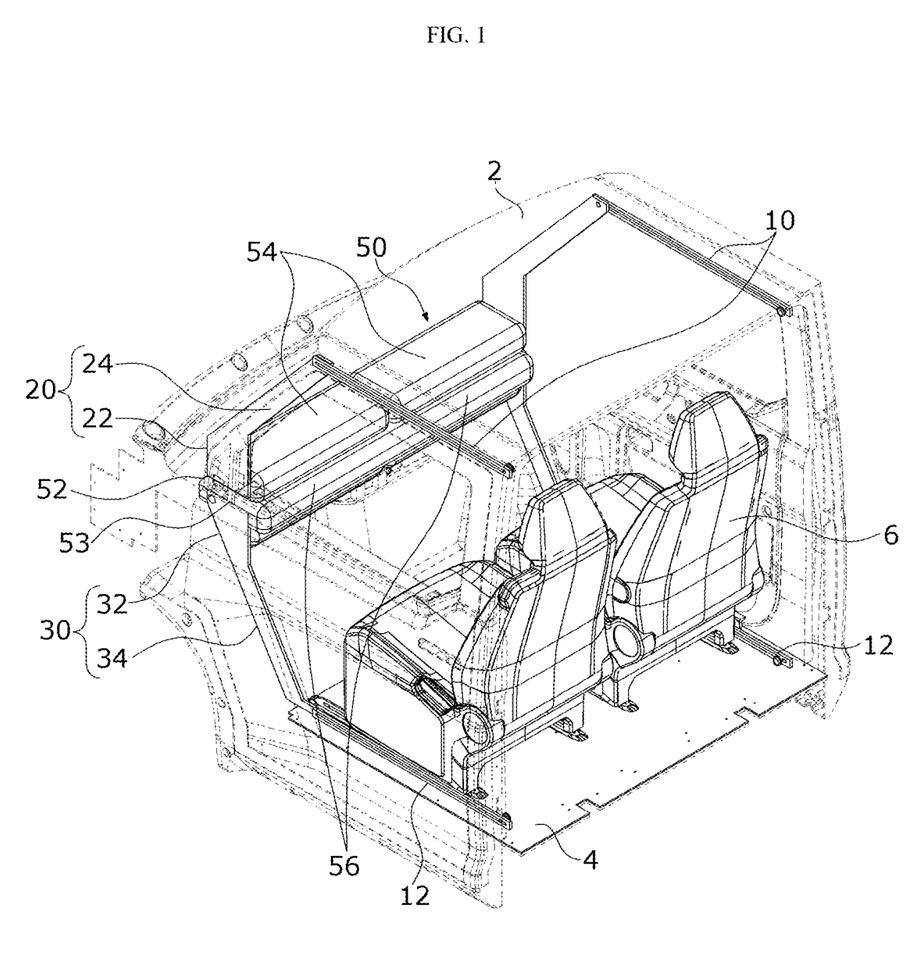
FIG. 1 is a view illustrating an example in which a moving cockpit for a vehicle according to one embodiment of the present disclosure is installed in a vehicle.
Figure 2:
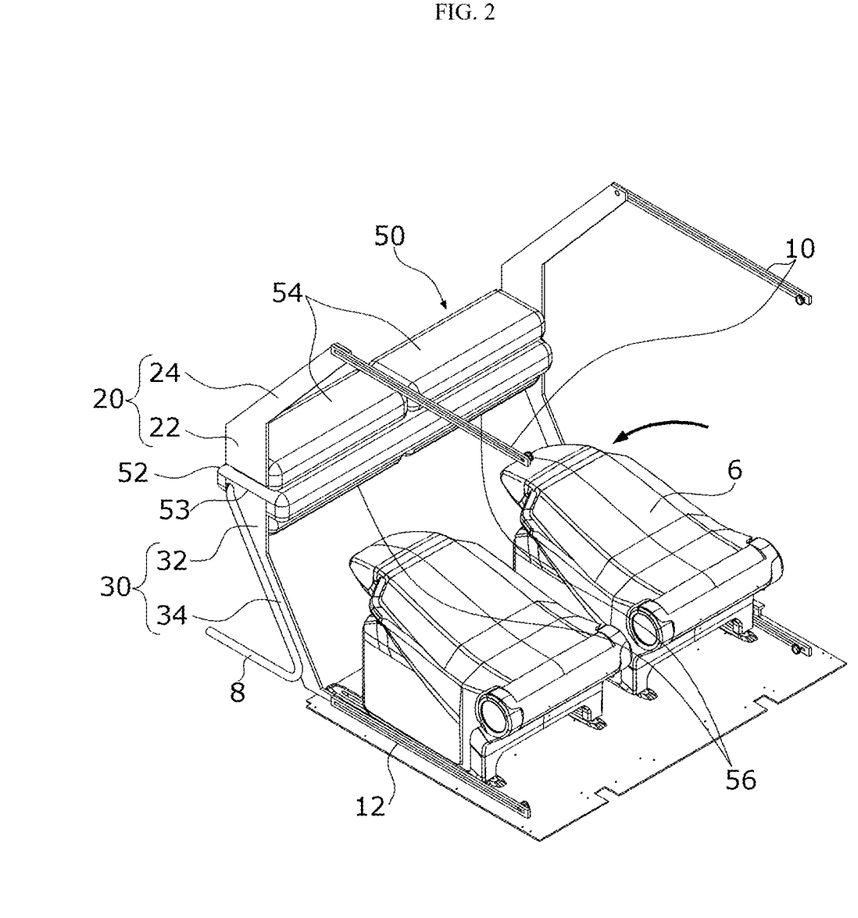
FIG. 2 is a view illustrating a state in which a seat is folded to move a cockpit module in the moving cockpit for a vehicle according to one embodiment of the present disclosure.
Figure 3:
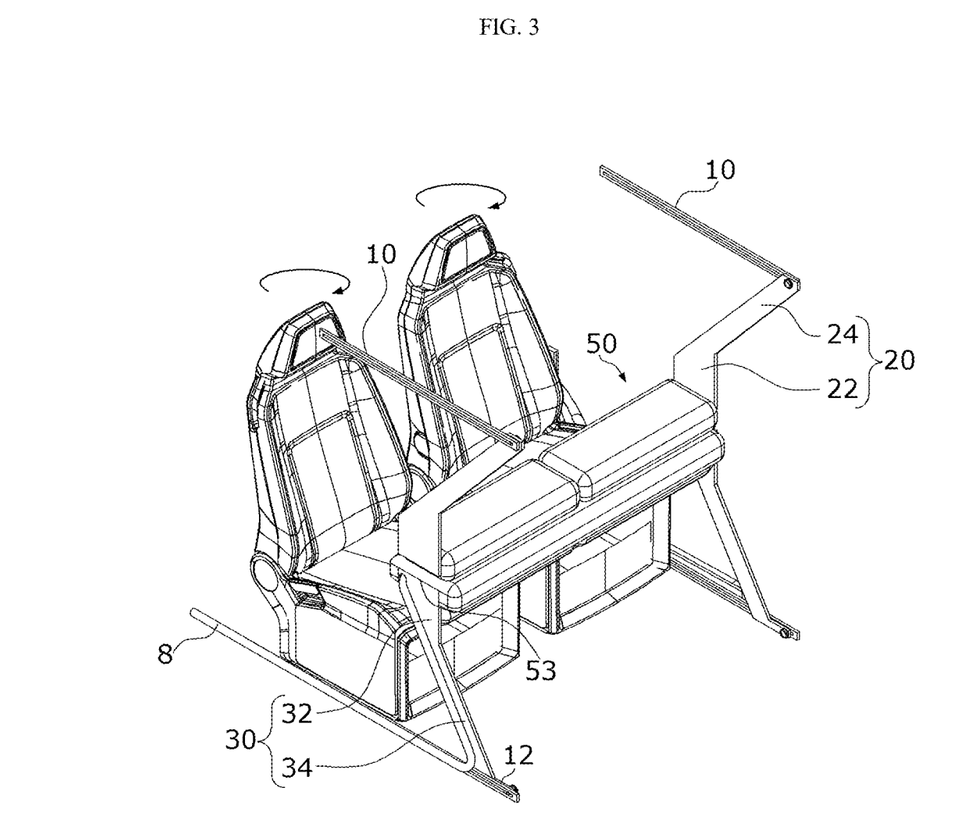
FIG. 3 is a view when viewed from the front after the cockpit module is moved backward in the moving cockpit for a vehicle according to one embodiment of the present disclosure.
Figure 4:
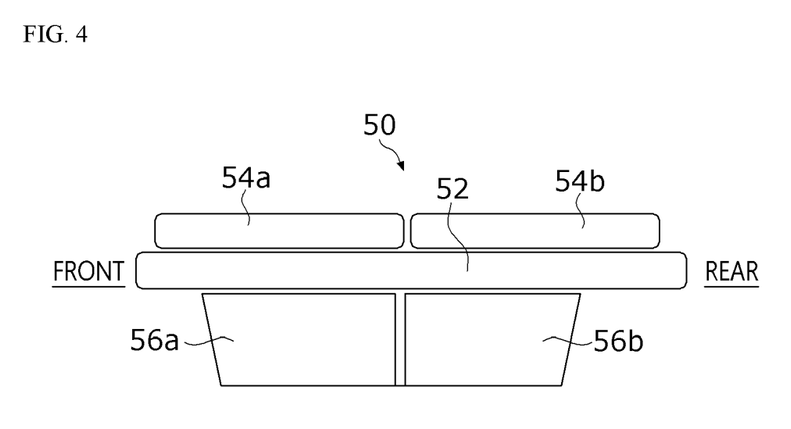
FIG. 4 is a view schematically illustrating a crash pad unit according to one embodiment of the present disclosure.

FIG. 1 is a view illustrating an example in which a moving cockpit for a vehicle according to one embodiment of the present disclosure is installed in a vehicle, FIG. 2 is a view illustrating a state in which a seat is folded to move a cockpit module in the moving cockpit for a vehicle according to one embodiment of the present disclosure, FIG. 3 is a view when viewed from the front after the cockpit module is moved backward in the moving cockpit for a vehicle according to one embodiment of the present disclosure, and FIG. 4 is a view schematically illustrating a crash pad unit according to one embodiment of the present disclosure.

As illustrated herein, the moving cockpit for a vehicle according to one embodiment of the present disclosure may include a cockpit module 50 installed in an inner front side of the vehicle, guide rails 10 and 12 installed by extending forward and backward on an inner panel of the vehicle, and cockpit moving units 20 and 30 movably installed on the guide rails 10 and 12 to move the cockpit module 50 forward and backward in the vehicle.

An upper panel 2 and a lower panel 4 are provided in the vehicle to form a ceiling surface and a floor surface, respectively. In addition, upper guide rails 10 are installed on both sides of the upper panel 2, and lower guide rails 12 is installed on both sides of the lower panel 4. The guide rails 10 and 12 are parts provided to guide a forward and backward movement of the cockpit moving units 20 and 30.

The cockpit moving units 20 and 30 are parts serving to move the cockpit module 50 while moving forward and backward along the guide rails 10 and 12. The cockpit moving units 20 and 30 may include upper brackets 20 installed to be movable along the upper guide rails 10 and connected to both sides of the cockpit module 50 and lower brackets 30 installed to be movable along the lower guide rails 12 and connected to both sides of the cockpit module 50.

The upper brackets 20 maybe disposed along the A-pillar of the vehicle and connected to both sides of the cockpit module 50 to support the cockpit module 50. Each of the upper brackets 20 may include a first connection portion 22 actually connected to both sides of the cockpit module 50 and a first extension portion 24 extending with an inclination from an upper end of the first connection portion 22 to the upper panel 2 to be seated on the upper guide rail 10.

The lower bracket 30 maybe disposed to be symmetric to the upper bracket 20 around the cockpit module 50 and connected to both sides of the cockpit module 50 to support the cockpit module 50. Each of the lower brackets 30 may include a second connection portion 32 actually connected to both sides of the cockpit module 50 and a second extension portion 34 extending with an inclination from an upper end of the second connection portion 32 to the lower panel 4 to be seated on the lower guide rail 12.

Meanwhile, the lower brackets 30 maybe seated in support grooves 53 formed on both side surfaces of the main plate 52 to support both sides of the main plate 52. The support grooves 53 are formed to open downward on both side surfaces of the main plate 52, and an upper end of the lower bracket 30 is inserted into the opened portion so that the main plate 52 maybe stably supported from below.

The upper bracket 20 and the lower bracket 30, which are described above, are mere examples of the cockpit moving units 20 and 30, and anything configured to support both sides of the cockpit module 50 and move the cockpit module 50 maybe applied thereto.

In addition, in this embodiment, a seat 6 maybe folded and rotate back and forth. Thus, when the seat 6 is in a folded state, as illustrated in FIG. 2, the cockpit module 50 maybe moved to an upper side of the seat 6, and upon completion of the movement of the cockpit module 50, the seat 6 may rotate back to implement a face-to-face mode, as illustrated in FIG. 3.

A wire 8 for supplying electrical power to the cockpit module 50 may extend along the lower bracket 30. Since the wire 8 has an extra length, the wire 8 may move along the lower guide rail 12 when the cockpit module 50 moves.

Referring to FIG. 4, the cockpit module 50 may include the main plate 52 and crash pad units 54 and 56 detachable from at least one of an upper surface and a lower surface of the main plate 52.

The crash pad units 54 and 56 may include an upper crash pad 54 detachable from the upper surface of the main plate 52 and a lower crash pad 56 detachable from the lower surface of the main plate 52. The upper crash pad 54 and the lower crash pad 56 are presented as examples of the crash pad units 54 and 56, but the crash pad units 54 and 56 are not limited thereto and may be crash pads detachable only from any one of the upper surface and the lower surface.

The upper crash pad 54 and the lower crash pad 56 may be provided in plural, and the upper crash pads 54 and the lower crash pads 56 may each have the same size or have different sizes. Each of the upper crash pads 54 and the lower crash pads 56 maybe divided into two pads and disposed so that occupants sitting in a front seat and a rear seat may use respective pads in a face-to-face mode. Here, the face-to-face mode means a state in which the cockpit module 50 in an autonomous driving vehicle is moved to an inner center region of the vehicle and front seat and rear seat occupants face each other.

That is, the upper crash pads 54 may include a first upper crash pad 54a disposed in a front side and a second upper crash pad 54b disposed behind the first upper crash pad 54a, and the lower crash pads 56 may include a first lower crash pad 56a disposed in a front side and a second lower crash pad 56b disposed behind the first lower crash pad 56a.

For example, in FIG. 4, a front seat occupant (driver) may use the first upper crash pad 54a and the first lower crash pad 56a, and a rear seat occupant may use the second upper crash pad 54b and the second lower crash pad 56b which are disposed in the rear side.

Figure 5:
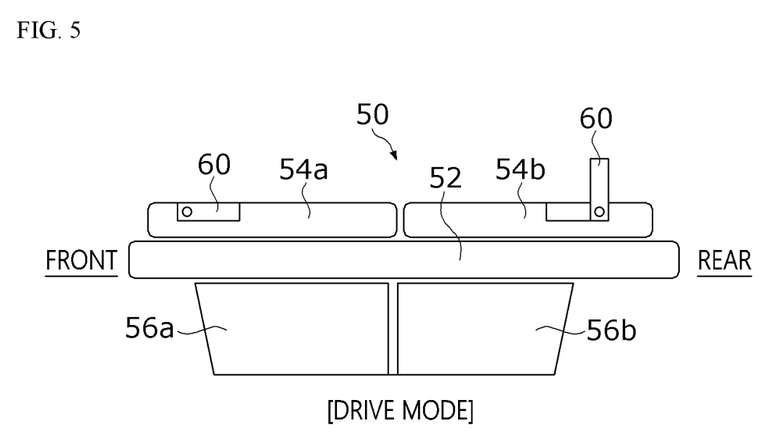
FIG. 5 is a view illustrating a drive mode of the crash pad unit according to one embodiment of the present disclosure.
Figure 6:
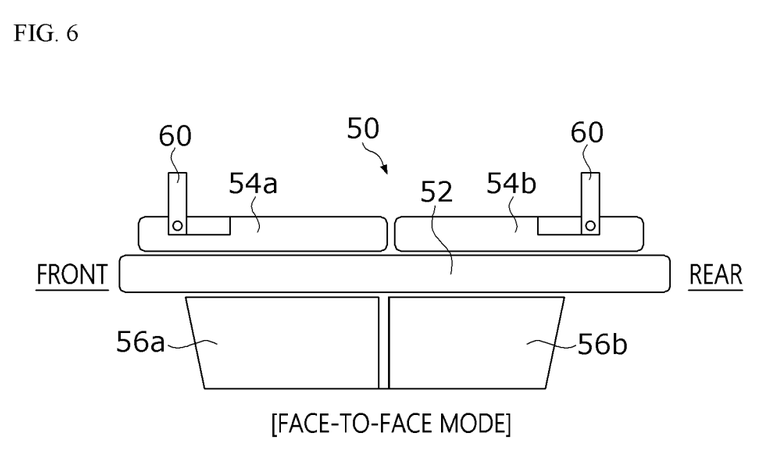
FIG. 6 is a view illustrating a face-to-face mode of the crash pad unit according to one embodiment of the present disclosure.

FIG. 5 is a view illustrating a drive mode of the crash pad unit according to one embodiment of the present disclosure, and FIG. 6 is a view illustrating a face-to-face mode of the crash pad unit according to one embodiment of the present disclosure.

In this embodiment, one end of an auxiliary display 60 maybe rotatably connected to an upper surface of the upper crash pad 54. The auxiliary display 60 is a part manipulated by an occupant to use an electronic device and may be used by being rotated at an adequate angle on the upper surface of the upper crash pad 54. Although not illustrated in detail in this drawing, the upper crash pad 54 may have parts available for various purposes such as a docking portion for docking an electronic device, a charging portion, and a receiving portion.

In addition, the lower crash pad 56 maybe used for various purposes according to convenience of occupants and may have, for example, a receiving portion for receiving various items, a foot massager for massage, and the like.

The drive mode illustrated in FIG. 5 is a state in which the cockpit module 50 is disposed in the inner front side of the vehicle. In this state, the auxiliary display 60 provided on an upper surface of the second upper crash pad 54b close to a driver side may be rotated upward for use. The auxiliary display 60 maybe used for purposes such as navigation, contents playback, and the like.

The face-to-face mode illustrated in FIG. 6 is a state in which the cockpit module 50 is disposed in an inner center region of the vehicle. In this state, since both front seat and rear seat occupants may use the upper crash pad 54, the auxiliary display 60 disposed on the upper surfaces of the first upper crash pad 54a and the second upper crash pad 54b may be rotated upward for use.

Figure 7:
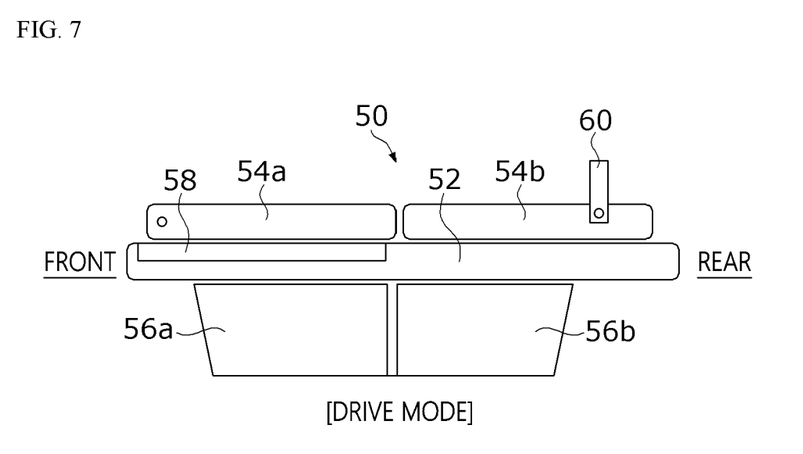
FIG. 7 is a view illustrating a drive mode of a crash pad unit according to another embodiment of the present disclosure.
Figure 8:
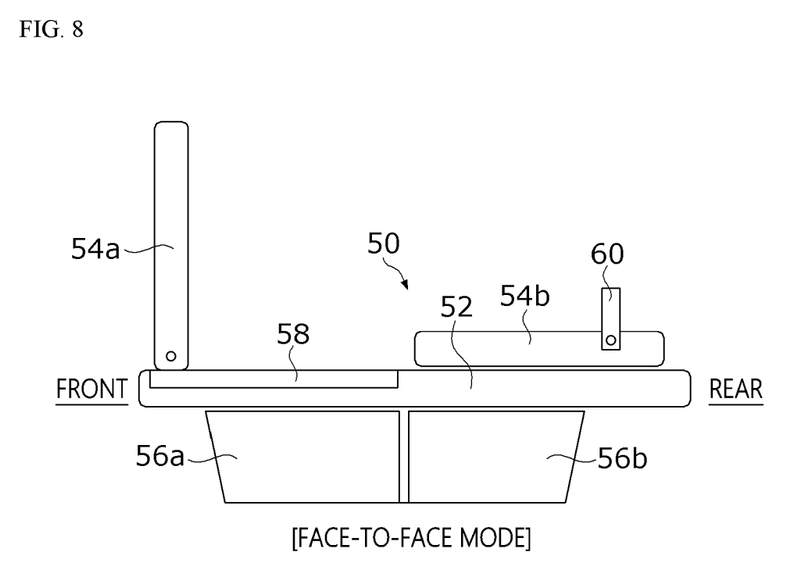
FIGS. 8 and 9 are views each illustrating a face-to-face mode of the crash pad unit according to another embodiment of the present disclosure.
Figure 9:
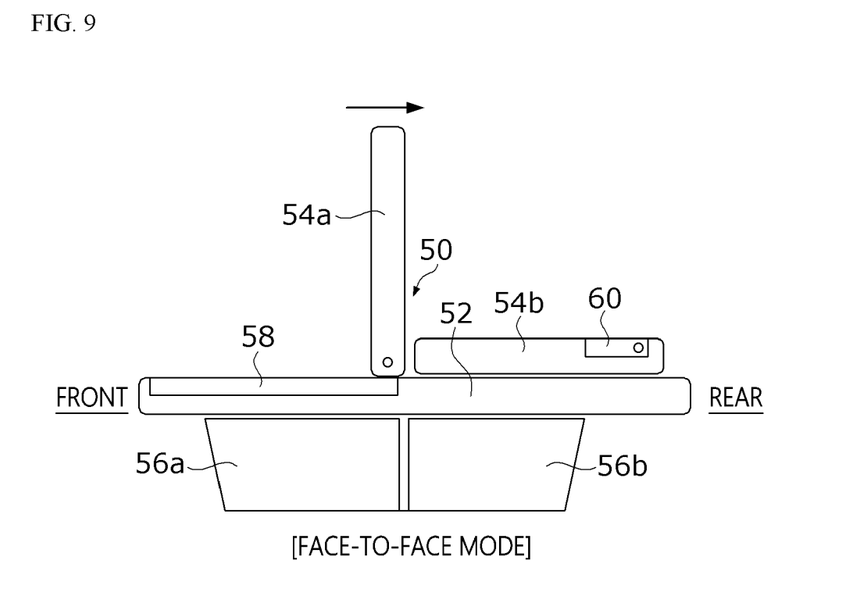

FIG. 7 is a view illustrating a drive mode of a crash pad unit according to another embodiment of the present disclosure, and FIGS. 8 and 9 are views each illustrating a face-to-face mode of the crash pad unit according to another embodiment of the present disclosure.

In this embodiment, the first upper crash pad 54a itself may be rotatably connected to one end on the main plate 52 and operate as a display. Here, the main plate 52 may have a rail portion 58 in which the first upper crash pad 54a is installed to be movable in a rotated state. In this drawing, the first upper crash pad 54a itself is illustrated to operate as a display but is not limited thereto, and the second upper crash pad 54b itself may operate as a display.

The face-to-face mode illustrated in FIG. 8 is a state in which the cockpit module 50 is disposed in the inner center region of the vehicle. In this state, both front seat and rear seat occupants may use the upper crash pad 54. The front seat occupant may rotate the first upper crash pad 54a upward and use the first upper crash pad 54a as a display. Herein, as illustrated in FIG. 9, the first upper crash pad 54a may be moved backward on the rail portion 58 as far as desired and used.

As described above, the cockpit module 50 is constructed in this embodiment by adequately disposing the plurality of crash pads 54 and 56 on the upper surface and lower surface of the main plate 52, so that there is an advantage in that the cockpit module 50 maybe used for various purposes according to convenience of an occupant.

According to one embodiment of the present disclosure, a cockpit module can be efficiently used in a vehicle according to convenience of an occupant because the cockpit module is movable according to a drive mode and a face-to-face mode.

In addition, according to one embodiment of the present disclosure, a cockpit module can be constructed by adequately disposing a plurality of crash pads on an upper surface and a lower surface of a main plate, and thus can be used for various purposes according to convenience of an occupant.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A moving cockpit for a vehicle, comprising:
   a cockpit module provided in an inner front side of the vehicle, wherein the cockpit module comprises:
   a main plate; and
   a crash pad unit configured to be detachable from one of an upper surface and a lower surface of the main plate, wherein the crash pad unit comprises:
   an upper crash pad configured to be detachable from the upper surface of the main plate; and
   a lower crash pad configured to be detachable from the lower surface of the main plate;
   a guide rail provided on an inner panel of the vehicle, the guide rail extending in a forward direction and a backward direction relative to the front side of the vehicle; and
   a cockpit moving unit movably provided on the guide rail, the cockpit moving unit being configured to move the cockpit module forward and backward in the vehicle, wherein the upper crash pad comprises:
   a first upper crash pad disposed in a front side of the upper crash pad; and
   a second upper crash pad disposed in a back side of the upper crash pad in line with first upper crash pad.

2. The moving cockpit of claim 1,
   wherein the lower crash pad comprises:
   a first lower crash pad disposed in the front side of the upper crash pad; and
   a second lower crash pad disposed in the back side of the upper crash pad in line with the first lower crash pad.

3. The moving cockpit of claim 1, further comprising an auxiliary display rotatably connected to an upper surface of the upper crash pad.

4. The moving cockpit of claim 1, further comprising a display provided in the upper crash pad,
   wherein the upper crash pad is rotatably connected to an end of the main plate.

5. The moving cockpit of claim 4, wherein the main plate comprises a rail portion configured to receive the upper crash pad and to be rotatably movable.

6. The moving cockpit of claim 1, wherein the lower crash pad includes a receiving portion formed therein.

7. The moving cockpit of claim 1, wherein the guide rail comprises:
   upper guide rails installed on a first side and a second side of an inner upper panel of the vehicle; and
   lower guide rails installed on a first side and a second side of an inner lower panel of the vehicle.

8. The moving cockpit of claim 7, wherein the cockpit moving unit comprises:
   upper brackets configured to be movable along the upper guide rails and connected to both sides of the cockpit module; and
   lower brackets configured to be movable along the lower guide rails and connected to both sides of the cockpit module.

9. The moving cockpit of claim 8, wherein the main plate includes support grooves defined in a first side surface and a second side surface of the main plate, and
   wherein the lower brackets are seated in the support grooves.

10. The moving cockpit of claim 9, wherein the lower brackets are configured to support the first side surface and the second side surface of the main plate.

11. The moving cockpit of claim 8, further comprising a wire configured to supply electrical power to the cockpit module, the wire extending along the lower bracket.

12. A cockpit module for a vehicle, comprising:
   a first cockpit moving part configured to move on a first guide rail of the vehicle;
   a second cockpit moving part configured to move on a second guide rail of the vehicle, wherein the first cockpit moving part and the second cockpit moving part are configured to translate the cockpit module in a first direction and a second direction of the vehicle;
   a main plate;
   an upper bracket moveably provided on the first guide rail; and
   a lower bracket moveably provided on the second guide rail, the upper bracket and the lower bracket being configured to support the main plate.

13. The cockpit module of claim 12, further comprising:
   a first crash pad configured to be detachably connected to an upper surface of the main plate; and
   a second crash pad configured to be detachably connected to a lower surface of the main plate.

14. The cockpit module of claim 13, wherein the first crash pad comprises a front seat portion and a rear seat portion, and
 wherein the front seat portion and the rear seat portion are configured to be arranged in a driving mode and a face-to-face mode.

15. The cockpit module of claim 13, wherein the second crash pad comprises a front seat portion and a rear seat portion, and
 wherein the front seat portion and the rear seat portion are configured to be arranged in a driving mode and a face-to-face mode.

\* \* \* \* \*